United States Patent [19]

Schmidt et al.

[11] Patent Number: 4,742,125
[45] Date of Patent: May 3, 1988

[54] PROCESS FOR THE PRODUCTION OF MERCAPTO GROUP-CONTAINING OLIGOURETHANES, OLIGOURETHANES OBTAINABLE BY THIS PROCESS AND THEIR USE IN VARIOUS POLYMER SYSTEMS

[75] Inventors: Manfred Schmidt, Dormagen; Wolfgang Wellner; Josef Pedain, both of Colonge; Hermann Gruber, Leverkusen, all of Fed. Rep. of Germany

[73] Assignee: Bayer Aktiengesellschaft, Leverkusen, Fed. Rep. of Germany

[21] Appl. No.: 831,776

[22] Filed: Feb. 20, 1986

[30] Foreign Application Priority Data

Mar. 9, 1985 [DE] Fed. Rep. of Germany ....... 3508428

[51] Int. Cl.$^4$ .................. C07C 149/437; C08G 18/38; C08G 59/66; C08F 279/00
[52] U.S. Cl. ................................. 525/333.2; 525/454; 528/51; 528/76; 560/158
[58] Field of Search ............... 525/454, 333.2; 528/51, 528/76; 560/158

[56] References Cited

U.S. PATENT DOCUMENTS

| 3,446,780 | 5/1969 | Bertozzi ............................ 528/52 |
| 4,110,295 | 8/1978 | Wilhelm et al. .................... 524/881 |
| 4,113,707 | 9/1978 | Louthan et al. ................... 528/279 |

FOREIGN PATENT DOCUMENTS

| 1770259 | 10/1971 | Fed. Rep. of Germany . |
| 2557088 | 6/1977 | Fed. Rep. of Germany . |
| 3121384 | 12/1982 | Fed. Rep. of Germany . |

Primary Examiner—Veronica P. Hoke
Attorney, Agent, or Firm—Gene Harsh; Joseph C. Gil; Thomas W. Roy

[57] ABSTRACT

The present invention is directed to a process for the production of oligourethanes having terminal mercapto groups by reacting organic polyisocyanates with sub-equivalent quantities of organic polyhydroxyl compounds and a mercapto-alkanol in the presence of at least one ester of phosphoric acid containing at least one hydroxyl group bound to phosphorus. The present invention is also directed to the mercapto group-containing oligourethanes obtainable by this process and their use as binders for oxidatively-hardenable coating and sealing compositions, additives for epoxide resins and cross-linking agents for plastics materials and plastics crude products containing olefinic double bonds.

16 Claims, No Drawings

PROCESS FOR THE PRODUCTION OF MERCAPTO GROUP-CONTAINING OLIGOURETHANES, OLIGOURETHANES OBTAINABLE BY THIS PROCESS AND THEIR USE IN VARIOUS POLYMER SYSTEMS

BACKGROUND OF THE INVENTION

1. Field of the Invention

This invention relates to a new process for the production of mercapto group-containing oligourethanes from organic polyisocyanates, organic polyhydroxyl compounds and mercapto-alkanols, certain acid esters of phosphoric acid being used as catalysts during reaction of the mercapto-alkanols; oligourethanes obtainable by this process and the use thereof as binders for oxidatively-hardenable coating and sealing compositions, as additives for epoxide resins and as cross-linking agents for plastics materials or plastics crude products containing olefinic double bonds.

2. Description of the Prior Art

Mercapto group-containing oligomers and polymers which may be oxidatively cross-linked and cured are known (see, for example, DE-OS No. 2,739,117, DE-OS No. 2,557,088, DE-AS No. 2,363,856 or DE-OS No. 3,121,384).

The important advantage of such binders over other categories of substances (such as oligourethanes having terminal NCO groups) resides, inter alia, in the fact that they also cure in the presence of water which may be added by moist pigments or additives or from the atmosphere, and form bubble-free polymers.

Furthermore, oligourethanes containing free NCO groups which are used as binders for sealing and coating compositions have several advantages besides the disadvantage of forming bubbles during curing with water, i.e., atmospheric moisture. They are suitable, for example, for the production of compositions which are particularly resistant to weathering and have long lasting elasticity, high toughness, good resistance to abrasion and stability towards solvents and other chemical influences.

Therefore, there have been many attempts to combine the valuable properties of the polyurethanes with the curing mechanism of mercapto groups. Oligourethanes having terminal mercapto groups are described in particular in DE-OS No. 1,770,259 and DE-AS No. 1,645,500. They are produced by firstly reacting a polyol with excess aromatic diisocyanate to form a prepolymer containing NCO groups and then urethanizing this prepolymer with an SH-group-containing alcohol. Oligourethanes containing terminal mercapto groups which cure oxidatively in bubble-free manner without foaming, even in the presence of moisture, are obtained in this way according to DE-OS No. 1,770,259 and DE-AS No. 1,645,500.

DE-OS No. 3,121,384 also describes oligourethanes having terminal mercapto groups. However, in contrast to DE-OS No. 1,770,259 and DE-AS No. 1,645,500, 1-isocyanatomethyl-1,3,3-trimethyl-5-isocyanatocyclohexane is used as isocyanate component in this case. Coating and sealing compositions which are characterized in particular by high light-fastness in addition to excellent stability to alkalies and heat are therefore obtained according to DE-AS No. 3,121,384.

Although the products described in the above-mentioned earlier publications basically represent valuable binders for sealing and coating compositions, they are accompanied to a greater or lesser extent by the disadvantage of a viscosity which is too high for many applications so that solvent-free use is often possible only when using considerable quantities of plasticizers. A certain advance was achieved with the systems in DE-OS No. 3,121,384, but a further reduction in viscosity of the products described in this earlier publication is still desirable.

It has now surprisingly been found that it is possible to reduce the viscosity of mercapto group-containing oligourethanes by producing the products by reacting mercapto-alkanols with organic polyisocyanates and sub-equivalent quantities of organic polyhydroxyl compounds or with NCO-prepolymers in the presence of certain acid esters of phosphoric acid described in more detail below.

SUMMARY OF THE INVENTION

The present invention relates to a process for the production of oligourethanes having terminal mercapto groups by the reaction of:

(a) organic polyisocyanates with (b) sub-equivalent quantities of organic polyhydroxyl compounds and (c) a mercapto-alkanol which is sufficient to provide an NCO/OH equivalent ratio of about 0.8 to 1.2, based on the excess of isocyanate groups resulting from the proportions of (a) and (b) used or the isocyanate groups present in the reaction product of (a) and (b) optionally freed from excess polyisocyanate (a), on the one hand and the hydroxyl groups of the mercapto-alkanol, on the other hand, characterized in that the reaction with the mercapto-alkanol (c) is carried out in the presence of (d) about 0.01 to 5%, by weight, based on the weight of components (a), (b) and (c), of at least one ester of phosphoric acid containing at least one hydroxyl group bound to phosphorous.

The invention also relates to the mercapto group-containing oligourethanes obtainable by this process and their use as binders for oxidatively-hardenable coating and sealing compositions, additives for epoxide resins and cross-linking agents for various plastics materials or plastics crude products containing olefinic double bonds.

DETAILED DESCRIPTION OF THE INVENTION

Suitable starting components (a) include aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula:

wherein n is 2 to 4, preferably 2; and

Q represents an aliphatic hydrocarbon radical containing 2 to 18, preferably 6 to 10 carbon atoms; a cycloaliphatic hydrocarbon radical containing 4 to 15, preferably 5 to 10 carbon atoms, an aromatic hydrocarbon radical containing 6 to 15, preferably 6 to 13 carbon atoms; or an araliphatic hydrocarbon radical containing 8 to 15, preferably from 8 to 13 carbon atoms.

Examples of such polyisocyanates include ethylene diisocyanate, tetramethylene diisocyanate, hexamethylene diisocyanate, dodecamethylene diisocyanate, 1,3-diisocyanato-cyclobutane, 1-isocyanato-3,3,5-trimethyl-5-isocyanatomethylcyclohexane (IPDI), 4,4'-diisocyanato-dicyclohexylmethane, 2,4'-diisocyanato-dicyclohexylmethane, 2,4-diisocyanatotoluene, 26-diisocyanatotoluene, mixtures of these two isomers, 24'-diisocyanato-diphenylmethane, 4,4'-diisocyanatodiphenylmethane, mixtures of these two isomers optionally with the higher homologues thereof, or 1,5-diisocyanato-naphthalene. Mixtures of the exemplified polyisocyanates may obviously also be used. IPDI, 2,4-diisocyantotoluene, industrial mixtures thereof with 2,6-diisocyanatotoluene or also mixtures of IPDI with the two lastmentioned isomers are particularly preferred starting polyisocyanates.

The starting components (b) are organic polyhydroxyl compounds or mixtures of organic polyhydroxyl compounds having an (average) hydroxyl functionality of at least about 2, preferably about 2.5 to 4, and having an (average) molecular weight of at least about 2000, preferably about 2000 to 10,000 and most preferably about 4000 to 7000, which may be calculated from the functionality and the hydroxyl group content. These particulars about the hydroxyl functionality and the molecular weight relate to the statistical mean values of these mixtures when using mixtures of various polyhydroxyl compounds. Consequently, individual components of these mixtures may have a hydroxyl functionality lying outside the specified ranges and, in particular, a molecular weight lying outside these ranges.

Suitable polyhydroxyl compounds which may be used as component (b) or as a portion of component (b) are, in particular, the polyester polyols known from polyurethane chemistry, the polyether polyols known from polyurethane chemistry and optionally the simple low molecular weight polyhydroxyl compounds known from polyurethane chemistry which may be present in small proportions in component (b).

Suitable polyester polyols include reaction products of polyhydric, preferably dihydric, and optionally also trihydric, alcohols with polybasic, preferably dibasic, carboxylic acids. The corresponding polycarboxylic acid anhydrides or corresponding polycarboxylic acid esters of lower alcohols or mixtures thereof may be used for producing the polyesters instead of the free polycarboxylic acids. The polycarboxylic acids may be aliphatic, cycloaliphatic, aromatic and/or heterocyclic and may optionally be substituted (for example by halogen atoms) and/or unsaturated.

Examples of such carboxylic acids and derivatives thereof include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride. Suitable polyhydric alcohols include ethylene glycol, propylene glycol-(1,2) and -(1,3), butylene glycol-(1,4)-(1,3) and -(2,3), hexane diol-(1,6), octane diol-(1,8), neopentylglycol, 1,4-bishydroxymethylcyclohexane, 2-methyl-1,3-propane diol, glycerine, trimethylolpropane, hexanetriol-(1,2,6), butane triol-(1,2,4), trimethylolethane, diethylene glycol, triethylene glycol, tetraethylene glycol, dipropylene glycol and dibutylene glycol. The polyester polyols generally have maximum acid numbers of about 5 and hydroxyl numbers of about 40 to 112.

Polyether polyols which may be used as component (b) or as a portion of component (b) include those which may be obtained by the polymerization of epoxides such as ethylene oxide, propylene oxide, butylene oxide, tetrahydrofuran, styrene oxide or epichlorohydrin, on their own (for example in the presence of Lewis catalysts such as BF$_3$) or by the addition of these epoxides, preferably ethylene oxide and propylene oxide, optionally in a mixture or in succession, to starting components containing reactive hydrogen atoms. Suitable starting materials include water or simple polyhydric alcohols of the type exemplified above with respect to the production of the polyester polyols.

Simple, i.e., lower molecular weight, polyols which are optionally used in small quantities in component (b) include the lower molecular weight polhydroxyl compounds exemplified above with respect to the production of the polyester polyols.

Component (b) most preferably comprises polyether polyols or mixtures of polyether polyols of (average) OH functionality of at least about 2, preferably of about 2.5 to 4, and having an (average) molecular weight of about 2000 to 10,000, preferably about 4000 to 7000, which may be calculated from the functionality and the hydroxyl content.

Various mercapto-alkanols, i.e. compounds which contain an alcoholic hydroxyl group in addition to a mercapto group may be used as component (c) in the process according to the invention. Such compounds generally have a molecular weight of 78 to 134. Examples include 2-mercapto-ethanol, 1-hydroxy-2-mercapto-propane, 1-hydroxy-3-mercapto-propane, 1-mercapto-4-hydroxy-butane or 1-hydroxy-6-mercaptohexane. However, mercapto-alkanols which also contain hetero-atoms, for example sulphide bridges or ester groups due to the production process, (such as by addition of disulphides to alkenols) may also be used. In such cases, the molecular weights are obviously correspondingly higher. It is particularly preferable to use 2-mercaptoethanol as component (c) in the process according to the invention.

Various acid esters of phosphoric acid are used as component (d) in the process according to the invention, i.e., esters of phosphoric acid which contain at least one hydroxyl group bound to phosphorus. Mixtures of such esters of phosphoric acid may obviously also be used. For example, compounds may be used which correspond to general formula:

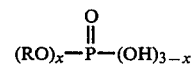

$$(RO)_x-\overset{O}{\underset{\|}{P}}-(OH)_{3-x}$$

wherein x is 1 or 2; and

R represents an alkyl radical containing 1 to 18, preferably 1 to 8 carbon atoms; a phenyl radical; or aralkyl radical containing 7 to 18, preferably 7 carbon atoms.

Examples of suitable phosphoric acid esters include dimethyl phosphate, diethyl phosphate, bis-(n-butyl) phosphate, bis-(n-hexyl) phosphate, bis-(n-dodecyl) phosphate, bis-(n-stearyl) phosphate, diphenyl phosphate, dibenzyl phosphate, bis-(2-ethylhexyl) phosphate, mono-tridecyl phosphate or monobenzyl phosphate. The dialkyl, diphenyl and diaralkyl esters of phosphoric acid are preferred over the monoalkyl, monophenyl and monoaralkyl esters. The corresponding dialkyl esters are more preferred, while bis-(n-butyl) phosphate or bis-(2-ethylhexyl) phosphate are most preferred as component (d).

The exemplified esters of phosphoric acid are used in the process according to the invention in a quantity of about 0.01 to 5% by weight, preferably about 0.05 to 2% by weight, based on the total weight of components (a), (b) and (c).

When carrying out the process according to the invention, the starting components (a) and (b) are used in quantities corresponding to an NCO/OH equivalent ratio of about 1.8:1 to 4:1, preferably about 2:1 to 3:1. It is also possible to use a large excess of component (a) and to subsequently remove unreacted excess polyisocyanate (a) from the resulting reaction product of (a) and (b), optionally by distillation. Component (c) is used at an NCO/OH equivalent ratio of about 0.8 to 1.2 preferably about 1, based on the NCO excess resulting from the proportions of components (a) and (b) or the isocyanate groups present in the reaction product of (a) and (b) optionally freed from excess polyisocyanate, on the one hand, and the hydroxyl groups of component (c), on the other hand.

It is essential to the invention for the reaction of component (c) to take place in the presence of component (d).

In order to carry out the process according to the invention, components (b), (c) and (d) may be premixed and allowed to react with component (a) in known manner. However, an embodiment of the process according to the invention in which an NCO-prepolymer is initially produced in known manner from components (a) and (b) and allowed to react with component (c) in a second stage of the reaction in the presence of component (d) is preferred. It is obviously also possible to react a proportion of component (b) with the total quantity of component (a) to form an NCO-prepolymer or an NCO-semiprepolymer and then to react this initial product with a mixture of component (c) and the remainder of component (b), provided that component (d) is also present in the reaction mixture in this case, at least in the last-mentioned stage of the reaction.

All the foregoing variations of the process according to the invention are carried out at a reaction temperature of about 50° to 150° C., preferably about 50° to 120° C.

The reactions according to the invention preferably take place under an inert gas, for example nitrogen.

As mentioned above, it is also possible to modify the preferred embodiment of the process according to the invention in such a way that component (b) is caused to react with a very large excess of component (a) in a first stage of the reaction, and then to remove the excess isocyanate by distillation before the thusobtained reaction product reacts with component (c).

The reaction according to the invention can be carried out in the presence of suitable inert solvents. However, the reaction preferably takes place in the absence of solvents. It is also possible to use known catalysts which accelerate the isocyanate addition reaction and is frequently advisable, particularly during the reaction between components (a) and (b).

Examples of catalysts to be used according to the invention are described in Kunststoff-Handbuch, Vol. VII, edited by Becker and Braun, Carl-Hanser Verlag, Munich 1983, for example on pages 92 to 98.

If used, the catalysts are used in a quantity of about 0.001 to 10%, by weight, preferably about 0.002 to 0.1% by weight, based on the total quantity of components (a) and (b).

If desired, it is also possible to eliminate final traces of isocyanate groups still present from the reaction mixture by addition of a chain-breaker after completion of the reactions according to the invention. Chain-breakers of this type include, in particular, monohydric alcohols or monofunctional amines such as n-butanol, 2-ethyl-hexanol, n-octanol, n-dodecanol, cyclohexanol, ethylene glycol monoethyl ether, n-butyl or di-n-butylamine, n-octylamine, n-stearylamine, N-methyl-n-stearylamine, pyrrolidone, piperidine or cyclohexylamine. If used, these chain-breakers are used in a quantity which is at least equivalent to the remaining quantity of isocyanate groups.

The products of the process according to the invention are terminal mercapto group-containing oligourethanes having an average molecular weight of about 2000 to 10,000, which can be calculated from the type and proportions of starting materials. The SH functionality of the products of the process according to the invention corresponds to the average hydroxyl functionality of component (b) when using the preferred organic diisocyanates as component (a).

The products of the process according to the invention are distinguished from corresponding mercapto group-containing oligourethanes which have been produced from the same starting materials, but without using the additive (d) which is essential to the invention by a considerably reduced viscosity. Consequently, the products of the process according to the invention are generally substances which are liquid at room temperature, or are no longer flowable at room temperature, but which, in comparison with the corresponding products of the prior art, can be converted in a flowable state using a small quantity of plasticizers. Plasticizers which are suitable for this purpose include the phthalates normally used for this purpose such as dibutylphthalate, dioctylphthalate, diisodecylphthalate, dibenzylphthalate, or butylbenzyl-phthalate.

The products of the process according to the invention exhibit a number of advantageous properties. As mentioned above, they have a comparatively reduced viscosity and are normally manageable without conventional plasticizers. In combination with suitable organic or inorganic oxidizing agents such as lead dioxide, manganese dioxide or organic peroxides, they cure to form bubble-free high molecular weight plastics materials which are characterized by a dry, non-blocking surface and also have excellent resistance to alkalies and heat. The same good property spectrum is obtained if the products of the process according to the invention in combination with known catalysts are subjected to oxidative hardening by atmospheric oxygen. Catalysts which are suitable for this application are described, for example, in U.S. Pat. Nos. 3,991,039 and 4,224,200.

In order to produce useable coating or sealing compositions, the products of the process according to the invention can contain, in addition to the abovementioned components, further auxiliaries and additives such as plasticizers of the type already exemplified, extenders, solvents, fillers, pigments, thickening agents and anti-aging agents, as well as specific additives for achieving particular properties. Flame-retarding additives (such as aluminum hydroxide or antimony trioxide) or halogen-containing additives (such as PVC powder) can be used as fire-proofing agents. Graphite or metal powder may be incorporated into compositions to increase electrical conductivity. It is also possible to add powdered rubber or granulated rubber to reduce the cost and to improve the abrasion properties. Emulsifying agents can also be used to assist dispersion in water.

The products of the process according to the invention are suitable as binders for sealing compositions of all types which are conventional, inter alia, in civil engineering and building, in vehicle, ship and aircraft construction or in the production of panes of insulating glass for sealing purposes and adhesion. The products of the process according to the invention are also suitable for the production one of cast resins, for example for the production of molding compositions and for casting compositions in the electrical industry. The products of the process according to the invention are also particularly suitable as binders for coating compositions, in particular, for the production of thick layered coatings, for example for the sealing of concrete structures, for roof coatings or for abrasion-resistant coatings in vehicle and boat construction.

The products of the process according to the invention are also valuable additives for epoxide resins. In these systems, the products of the process according to the invention act as elasticizing hardeners. Two-component systems of this type based on polyepoxides of the type known from industrial epoxide chemistry and on the products of the process according to the invention are suitable in practice for applications of the type exemplified above.

The products of the process according to the invention are also suitable as cross-linking agents for plastics materials or plastics crude products, for example of polybutadiene resins, containing olefinic double bonds.

The invention is further illustrated but is not intended to be limited by the following examples in which all parts and percentages are by weight unless otherwise specified.

EXAMPLES

EXAMPLE 1

(Comparison Example corresponding to Example 2 of DE-AS No. 1,645,500)

348 g (2 mol) of a mixture of 80 parts of 2,4-and 20 parts of 2,6-diisocyanatotoluene were reacted at 100° to 110° C. with 2004 g (1 mol) of a polypropylene glycol having an average molecular weight of 2004 under nitrogen to form the corresponding NCO-prepolymer. The thus-obtained NCO-prepolymer was then reacted with 156 g (2 mol) of mercapto-ethanol in the presence of 2.4 ml of concentrated sulphuric acid at 70° C. until the NCO content of the reaction mixture had dropped to 0.1%. The resultant resin had a viscosity of 65,300 mPa.s at 25° C.

EXAMPLE 2

(according to the invention)

Example 1 was repeated, except that 27.6 g (1.1%, based on total mixture) of bis-(2-ethylhexyl)phosphate were used instead of the concentrated sulphuric acid. The resulting resin had a viscosity of 37,500 mPa.s at 25° C.

EXAMPLE 3

(Comparison Example corresponding to Example 1 of DE-OS No. 1,770,259, but using mercapto-ethanol instead of mercapto-butanol)

600 g (0.2 mol) of a polyether polyol produced by the propoxylation of trimethylolpropane and having a molecular weight of 3000 were reacted under nitrogen with 104.4 g (0.6 mol) of the diisocyanate according to Example 1 at 115° C. to form the corresponding NCO-prepolymer. 46.8 g (0.6 mol) of 2-mercapto-ethanol were then added to the reaction mixture. The reaction mixture was stirred at 135° C. until the NCO content had dropped to below 0.2%. The resulting resin had a viscosity of 272 Pa.s at 25° C.

EXAMPLE 4

(according to the invention)

Example 3 was repeated with the difference that 3.7 g (0.5%, based on the total mixture) of bis-(n-butyl) phosphate were added before the mercapto-ethanol. The resulting resin had a viscosity of 133.5 Pa.s (25° C.).

EXAMPLE 5

(Comparison Example corresponding to Example 1 of DE-OS No. 3,121,384)

6000 g (1 mol) of a polyether polyol having an average molecular weight of 6000, which had been obtained by the propoxylation of trimethylolpropane and subsequent ethoxylation of the propoxylation product (molar ratio PO:EO=78:22), were reacted with 666 g (3 mol) of IPDI under nitrogen as protective gas at 100° C. to form the corresponding NCO-prepolymer having an NCO content of 1.8%. 222.6 g (2.85 mol) of mercapto-ethanol were then added. The reaction mixture was then stirred at 100° C. until no further NCO group could be detected in the IR spectrum. A clear, substantially colorless liquid having a viscosity of 110 Pa.s (23° C.) was obtained.

EXAMPLE 6

(according to the invention)

Example 5 was repeated except that 34.5 g (0.5%, based on total mixture) of bis-(n-butyl) phosphate were added to the NCO-prepolymer before the addition of mercapto-ethanol. A resin having a viscosity of 40.2 Pa.s (23° C.) was obtained.

EXAMPLE 7

(use of various acidic additives and the influence on viscosity)

5190 g (1.08 mol) of a polyether polyol having an average molecular weight of 4800, which had been obtained by propoxylation of trimethylolpropane and subsequent ethoxylation of the propoxylation product (molar ratio PO:EO=83:17), were reacted with 810 g (3.64 mol) of IPDI at 50° C. in the presence of 70 ppm of dibutyl tin dilaurate, based on the total weight of the two reactants, to form the corresponding NCO-prepolymer. After a reaction period of 1 hour, the NCO content had fallen to 2.9%. 0.5%, based on the weight of the NCO-prepolymer, of oleic acid was then incorporated into the resulting NCO-prepolymer. 323 g (4.14 mol) of mercapto-ethanol were then added. The reaction mixture was finally stirred at 100° C. until the NCO content had fallen below 0.1% (Example 7A).

The same process was adopted in seven further parallel tests (Examples 7B to 7H), but the acids listed in the following Table were added instead of oleic acid.

The viscosities of the individual products are compiled in the following Table.

| Example 7 | Addition | Viscosity (mPa.s 25° C.) |
|---|---|---|
| A | Oleic acid | 205,000 |
| B | Acetic acid | 151,000 |
| C | Dipropyl phosphite | 142,000 |
| D | Trichloroacetic acid | 95,000 |
| E | Sulphuric acid | cloudy, lump formation |
| F | Phosphoric acid | cloudy, heterogeneous |
| G | Bis-(2-ethylhexyl) phosphate | 35,000 |
| H | Bis-(n-butyl) phosphate | 29,000 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an oligourethane having terminal mercapto groups which comprises reacting
   (a) an organic polyisocyanate with
   (b) a sub-equivalent quantity of an organic polyhydroxyl compound and
   (c) a quantity of a mercapto-alkanol which is sufficient to provide an NCO/OH equivalent ratio of about 0.8 to 1.2, based on the hydroxyl groups of said mercapto-alkanol and either the excess isocyanate groups resulting from the proportions of (a) and (b) used or the isocyanate groups present in the reaction product of (a) and (b) after removal of at least a portion of excess polyisocyanate (a),
wherein the reaction with said mercapto-alkanol (c) is carried out in the presence of
   (d) about 0.01 to 5% by weight, based on the weight of components (a), (b) and (c), of at least one ester of phosphoric acid containing at least one hydroxyl group bound to phosphorous.

2. The process of claim 1 which comprises initially preparing an NCO-prepolymer or an NCO-semiprepolymer by reacting component (a) with at least a portion of component (b) and subsequently reacting said NCO-prepolymer or said NCO-semiprepolymer with component (c) or with a mixture of component (c) and the remainder of component (b).

3. The process of claim 1 which comprises reacting component (a) with a mixture of components (b) and (c) without initially forming an NCO-prepolymer or an NCO-semiprepolymer.

4. The process of claim 1 wherein said organic polyisocyanate comprises a member selected from the group consisting of 1-isocyanato-3,3,5-trimethyl-5-isocyanatometyl-cyclohexane, 2,4-diisocyanaoto-toluene, 2,6-diisocyanato-toluene, and mixtures thereof.

5. The process of claim 1 wherein said polyhydroxyl compound has a average hydroxyl functionality of about 2.5 to 4 and an average molecular weight of at least about 2000 and wherein said organic polyhydroxyl compound comprises a polyether polyol or a mixture of polyether polyols.

6. The process of claim 1 wherein said mercapto-alkanol (c) comprises mercapto-ethanol.

7. The process of claim 1 wherein components (a) and (b) are used in a quantity corresponding to an NCO/OH equivalent ratio of about 1.8 to 4.

8. A process for the production of an oligourethane having terminal mercapto groups which comprises reacting
   (a) an organic polyisocyanate comprising a member selected from the group consisting of 1-isocyanato-3,3,5-trimethyl-5-isocyanatomethylcyclohexane, 2,4-diisocyanatotoluene, 2,6-diisocyanatotoluene and mixtures thereof with
   (b) a quantity of an organic polyhydroxyl compound which corresponds to an NCO/OH equivalent ratio of component (a) to component (b) of about 1.8 to 4 and
   (c) a quantity of mercapto-ethanol which is sufficient to provide an NCO/OH equivalent ratio of about 0.8 to 1.2, based on the hydroxyl groups of mercaptoethanol and either the excess isocyanate groups resulting from the proportions of (a) and (b) used or the isocyanate groups present in the reaction product of (a) and (b), after removal of at least a portion of the excess polyisocyanate (a),
wherein the reaction with mercapto-ethanol is carried out in the presence of
   (d) about 0.01 to 5% by weight, based on the weight of components (a), (b) and (c), of at least one ester of phosphoric acid containing at least one hydroxyl group bound to phosphorus.

9. The process of claim 8 which comprises initially preparing an NCO-prepolymer or an NCO-semiprepolymer by reacting component (a) with at least a portion of component (b) and subsequently reacting said NCO-prepolymer or said NCO-semiprepolymer with component (c) or with a mixture of component (c) and the remainder of component (b).

10. The process of claim 8 wherein said polyhydroxyl compound has an average hydroxyl functionality of about 2.5 to 4 and an average molecular weight of at least about 2000 and wherein said organic polyhydroxyl compound comprises a polyether polyol or a mixture of polyether polyols.

11. The process of claim 9 wherein said polyhydroxyl compound has an average hydroxyl functionality of about 2.5 to 4 and an average molecular weight of at least about 2000 and wherein said organic polyhydroxyl compound comprises a polyether polyol or a mixture of polyether polyols.

12. The oligourethane produced in accordance with claim 1.

13. The oligourethane produced in accordance with claim 8.

14. The oligourethane produced in accordance with claim 11.

15. An oxidatively-hardenable coating or sealing composition wherein the binder comprises the oligourethane of claim 12.

16. A composition which comprises
   (a) a component selected from the group consisting of epoxide resins and polymers containing olefinic double bonds and
   (b) the oligourethane of claim 12 in an amount sufficient to act as an elasticizing hardener for said epoxide resins or in an amount sufficient to crosslink said polymers containing olefinic double bonds.

* * * * *